United States Patent
Kukulski et al.

(10) Patent No.: US 10,252,734 B2
(45) Date of Patent: Apr. 9, 2019

(54) DEVICE ABSORBING THE ENERGY OF IMPACTS OF RAILWAY CARS

(71) Applicant: AXTONE SPOLKA AKCYJNA, Kanczuga (PL)

(72) Inventors: Jan Kukulski, Kosina (PL); Leszek Wasilewski, Gniewczyna (PL)

(73) Assignee: AXTONE SPOLKA AKCYJNA (PL)

( * ) Notice: Subject to any disclaimer, the term of this patent is extended or adjusted under 35 U.S.C. 154(b) by 0 days.

(21) Appl. No.: 15/532,774

(22) PCT Filed: Nov. 30, 2015

(86) PCT No.: PCT/IB2015/059202
§ 371 (c)(1),
(2) Date: Jun. 2, 2017

(87) PCT Pub. No.: WO2016/088012
PCT Pub. Date: Jun. 9, 2016

(65) Prior Publication Data
US 2017/0361855 A1 Dec. 21, 2017

(30) Foreign Application Priority Data
Dec. 2, 2014 (PL) .................................... P.410337

(51) Int. Cl.
*F16F 7/12* (2006.01)
*B61G 11/16* (2006.01)
(Continued)

(52) U.S. Cl.
CPC ............... *B61G 11/16* (2013.01); *B61G 9/20* (2013.01); *B61G 11/18* (2013.01); *F16F 7/127* (2013.01)

(58) Field of Classification Search
CPC ... B61G 9/10; B61G 9/18; B61G 9/20; B61G 11/16; B61G 11/18; F16F 7/12; F16F 7/127
(Continued)

(56) References Cited

U.S. PATENT DOCUMENTS 3,779,591 A * 12/1973 Rands ..................... B60R 19/34
188/375
4,337,852 A * 7/1982 Flory ..................... B63B 21/00
188/375
(Continued)

FOREIGN PATENT DOCUMENTS

CN 102107664 A 6/2011
CN 102180182 A 9/2011
(Continued)

OTHER PUBLICATIONS

International Search Report and Written Opinion for PCT/IB2015/059202; dated Apr. 1, 2016; 8 pages.
(Continued)

*Primary Examiner* — Thomas J Williams
(74) *Attorney, Agent, or Firm* — Barclay Damon, LLP

(57) ABSTRACT

An energy absorbing device has a rod with a part, suitable for cutting by surrounding cutting tools mounted in a body sleeve and oriented to the inside. In addition, the rod has an angular guiding part passing into the part suitable for cutting and is pivoted in a support, wherein the body sleeve with the attached cutting tools is connected by breakable elements with the support.

20 Claims, 4 Drawing Sheets

(51) Int. Cl.
*B61G 9/20* (2006.01)
*B61G 11/18* (2006.01)

(58) Field of Classification Search
USPC .................................................. 188/375, 376
See application file for complete search history.

(56) References Cited

U.S. PATENT DOCUMENTS

| | | | | |
|---|---|---|---|---|
| 4,341,291 A * | 7/1982 | Flory | ...................... | B63B 21/00 |
| | | | | 188/375 |
| 4,346,795 A | 8/1982 | Herbert | | |
| 5,090,755 A * | 2/1992 | Garnweidner | .......... | F16F 7/127 |
| | | | | 188/375 |
| 6,601,886 B1 * | 8/2003 | Thayer | .................... | B60R 19/34 |
| | | | | 188/375 |
| 9,290,189 B2 * | 3/2016 | Kukulski | ................. | B61G 9/10 |
| 2018/0043911 A1 * | 2/2018 | Kukulski | ............... | B61G 11/16 |

FOREIGN PATENT DOCUMENTS

| | | | | |
|---|---|---|---|---|
| GB | 860691 A | 2/1961 | | |
| JP | 60-260730 | 12/1985 | | |
| JP | 60260730 A | * 12/1985 | .............. | F16F 7/127 |
| KR | 10-0916598 B1 | 9/2009 | | |
| PL | 202114 B1 | 6/2009 | | |
| PL | 211405 B3 | 5/2012 | | |
| WO | WO 2009/072843 A2 | 6/2009 | | |

OTHER PUBLICATIONS

Polish Search Report for P.410337; dated Aug. 8, 2015; 1 page.
Chinese Office Action for CN 201580072278.2; dated May 25, 2018; 5 pages.

* cited by examiner

US 10,252,734 B2

DEVICE ABSORBING THE ENERGY OF IMPACTS OF RAILWAY CARS

CROSS REFERENCE TO RELATED APPLICATIONS

This application is a national stage application under 35 U.S.C. § 371 of International Application No. PCT/IB2015/059202, filed Nov. 30, 2015, which claims priority of Polish Patent Application No. P.410337, filed Dec. 2, 2014, the entire contents of each application being herein incorporated by reference.

TECHNICAL FIELD

The present invention relates to a device absorbing the energy of impacts of railway cars, applicable particularly in railway central couplers.

BACKGROUND ART

An impact energy absorption device comprising a rod suitable for cutting by the surrounding cutting tools arranged uniformly in the body sleeve is known from patent description PL202114. In order to ensure the proper guiding of cutting tools, the blades of these tools are placed in guides formed on the outer surface of the rod.

There is also known from patent description PL 211405 an impact energy absorption device comprising a rod, with a smoothly varying diameter, suitable for cutting by means of cutting tools. In particular, the rod takes the form of a conic, pyramid or other curvilinear form to provide increased energy absorption capacity in the event of collisions of high kinetic energy.

Known devices perform well their tasks at normal collisions, however in case of an increased deviation angle between the cars, striking each other, some uncontrolled displacements between the body sleeve with the cutting tools and the machined rod occur. Such displacement causes the deformation of the cooperating parts, which in turn makes impossible further efficient absorption of energy.

SUMMARY OF THE INVENTION

The aim of the invention is to provide an impact energy absorbing device with increased resistance to lateral forces which, with its simple construction, would be able to absorb high energy in an emergency such as collision of railway cars and to protect these cars from damage, in particular, with increased angular deviations occurring between the cars hitting each other.

The device of the invention comprises a rod, a part of which is suitable for cutting by surrounding cutting tools mounted in a body sleeve and oriented to the inside of the sleeve. The invention is characterized in that the rod has an angular guiding part passing into a part suitable for cutting and is pivoted on a support, wherein the body sleeve with the attached cutting tools is connected to the support by means of breakable elements.

Preferably, the angular guiding part of the rod is connected to a lug embedded in holes of the support by an axle perpendicular to the axis of the rod.

Preferably, breakable elements are screws with a determined strength.

Preferably, the surface of the angular guiding part is inclined at an angle within the range from 7° to 30° relative to the axis of the rod, more preferably between 11° to 23°, and even more preferably between 12° to 18°.

Preferably, the angular guiding part is conical in shape.

Preferably, the rod has an increasing wall thickness in the angular guiding part.

Preferably, the lug embedded in the holes of the support has a cylindrical part intended to be embedded in the slot formed in the angular guiding part of the rod.

Preferably, a hardness of the surface layer of the initial region of the angular guiding part surface is greater than the limit of machinability, wherein the closer to the part of the rod suitable for cutting, the hardness of the surface layer of the angular guiding part decreases below the limit of machinability.

The pivoted fixing of the rod in the support, and the use of breakable elements connecting the body sleeve with the support allows easier alignment of the rod with the contact of its angular guiding part with the cutting tools mounted in the body sleeve.

By combining the angular guiding part of the rod with the lug swingably seated in the holes of the support a simple articulation was obtained, providing the rotation of the rod with respect to the body sleeve fitted with the cutting tools.

The use of the screws with the determined strength as the breakable elements simplifies the construction since the screws are used in the device according to the invention at the same time as fasteners and safety components, determining the limit of the pressure force exerted by the cars on each other, at which the energy absorption by machining is triggered.

Inclination of the surface of the guiding part at the angle within the range from 7° to 30° relative to the axis of the rod allows efficient alignment of the rod with respect to the body sleeve with cutting tools. Increasing the inclination above the limit of 30° could cause the driving of the cutting tools into the initial area of the angular guiding part and its deformation, and thereby prevent the displacement of the body sleeve with the cutting tools into the area of the rod intended for cutting.

Increasing the thickness of the walls of the angular guiding part is intended to increase the modulus of rigidity and prevent deformation in this area.

A cylindrical part of the lug allows its exact axial seating relative to the rod axis.

Hardening of the outer layer of the initial area of the angular guiding part is intended to produce the sliding contact of the cutting tools in this initial area, thereby providing better guidance of the further part of the rod, suitable for cutting, relative to the body sleeve with the cutting tools, and thus, more effective alignment of the rod with respect to said body sleeve.

BRIEF DESCRIPTION OF DRAWINGS

The invention embodiment is illustrated in the drawing, in which.

DETAILED DESCRIPTION OF EMBODIMENTS

Figure 1:
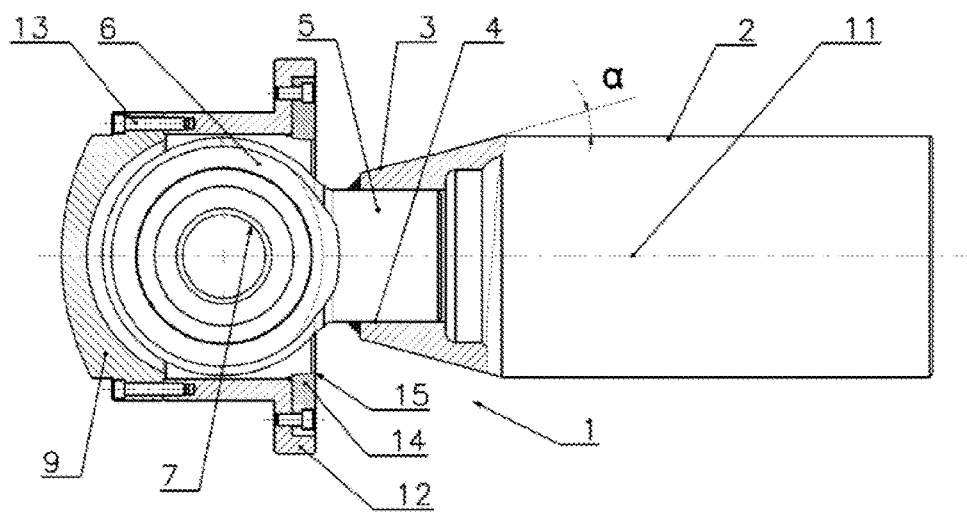
FIG. 1 shows the device absorbing the energy of impacts of railway cars according to the invention at rest, before impact, in a top view with a partial axial section.
Figure 2:
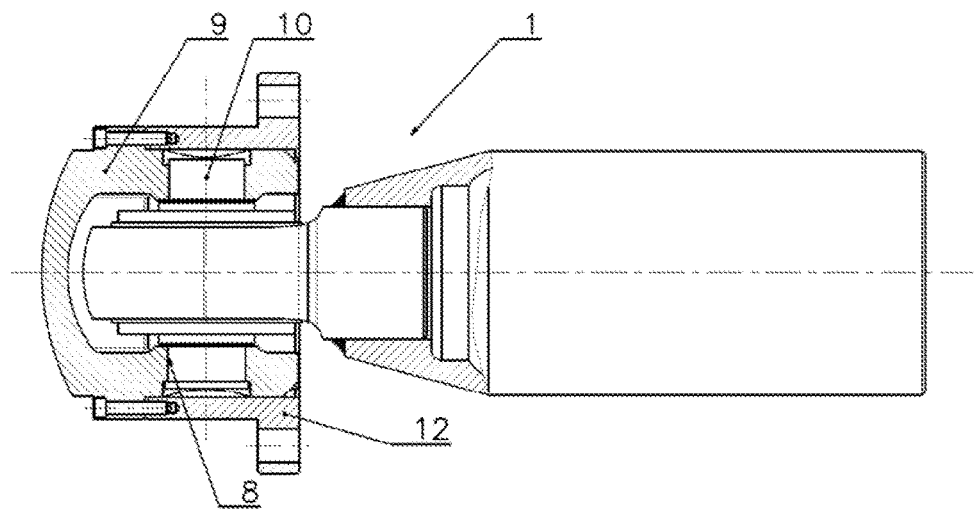
FIG. 2 shows the energy absorbing device at rest, in a side view with a partial axial section.

As shown in the embodiment in FIG. 1 and FIG. 2, the device absorbing energy of impacts of railway cars according to the invention comprises a steel rod 1 with a part 2, suitable for cutting and with an angular guiding part 3, with a surface inclined relative to an axis of the rod 1 at an angle of α=15°. The rod 1 is in the form of the sleeve with a substantially constant thickness in the part 2 suitable for cutting, and in the frustoconical form in the guiding part 3. In addition, the end region of the guiding part 3 has also a function of the area intended both for guiding and for initial cutting. The guiding part 3 has a cylindrically formed axial slot 4, in which a cylindrical part 5 of a lug 6 is mounted. The said cylindrical part 5 is also welded to the face of the angular guiding part 3. The execution of the angular guiding part 3 in the form of a truncated cone with the cylindrical slot 4 enables obtaining the increasing thickness of that part as it approaches the part 2 suitable for cutting. A hole 7 of the lug 6 and holes 8 of the support 9 house an axle 10, perpendicular to axis 11 of the rod 1, allowing the pivoted attachment of the lug 6, and thereby the pivoted attachment of the whole rod 1.

The support 9 is fixed to a body sleeve 12 with breakable elements 13 in the form of screws with a determined tensile strength. Proper selection of the quantity, diameter and material strength of the screws allows to determine the limit at which the detachment of the body sleeve 12 from the support 9 occurs and, therefore, allows to determine the limit of energy existing between the railway cars striking each other, at which the step of kinetic energy absorption by cutting is triggered. To this end, the body sleeve 12 is provided with cutting tools 14 distributed circumferentially and fixed on its front part. The cutting tools 14 are oriented into the interior of the body sleeve 12, and tips 15 of blades of these cutting tools 14 are arranged on a smaller diameter than the diameter of the cylindrical part 2 of the rod 1.

In the illustrated embodiment, the rod 1 has an initial part of the angular surface of the guiding part 3 hardened to a value within the range of 45-55 HRC with the hardness of the cutting tools within the range of 58-63 HRC. For the interpretation of the embodiment, as the initial area of the angular surface of the guiding part 3, the lateral surface of a truncated cone starting with its smallest diameter and extending to half its height was adopted. The remainder of the angular guiding part 3 has the hardness decreasing as approaching the largest diameter, wherein from the diameter of the cone corresponding to the diameter of the distribution of the tips 15 of the blades of the cutting tools 14, the angular surface hardness is the smallest and has a value within the range of 27-30 HRC, also the whole sleeve part 2, suitable for cutting, has the same hardness.

In another embodiment, in order to increase the progressivity of the absorption of the kinetic energy of the impact of railway cars, the hardness of the sleeve part 2, suitable for cutting, increases in the direction of the travel of cutting tools from the hardness within the range of 27-30 HRC to the limit of machinability i.e. 38-43 HRC with the hardness of the cutting tool blades within the range of 58-63 HRC. The limit of machinability was adopted as the difference in the hardness of the blade of the cutting tool and the hardness of the cut part of 20 HRC, therefore, at a blade hardness of 58 HRC, the limit value of the surface layer of the part suitable for cutting is 38 HRC. A similar effect of increasing the progressivity of the energy absorption can be achieved in the present invention, not shown in the drawing, by increasing the thickness of the layer being cut along the cutting path, which is obtainable by the use of the sleeve part 2 with an increasing outer diameter in the direction of travel of the cutting tools 14. The surface of the angular guiding part 3 can be inclined relative to the axis 11 of the rod 1 at an angle α within the range from 7° to 30°, but the best conditions in the majority of cases of the impacts of railway cars are provided by an angle α=15°.

In another embodiment, not illustrated in the drawing, the angular guiding part 3 has the shape of a truncated pyramid with a square base and passes into the part 2, suitable for cutting, in the form of a sleeve with a square cross section, in which case also the body sleeve 12 has a square internal opening allowing loose movements of the whole rod 1 along its axis.

Figure 3:
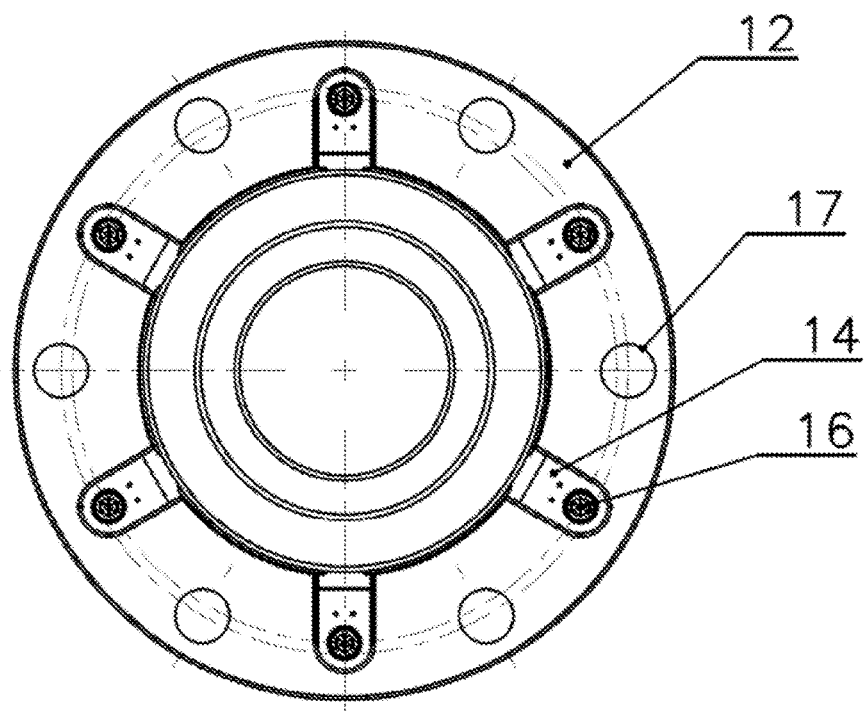
FIG. 3 shows the energy absorbing device in a front view.

As shown in FIG. 3, the device of the invention has six cutting tools 14 distributed at equal angular intervals and mounted by means of screws 16 in recesses formed in the front part of the body sleeve 12. Holes 17 made symmetrically between the cutting tools 14 are intended for fixing the body sleeve 12 to the front wall of a railway car.

Figure 4:
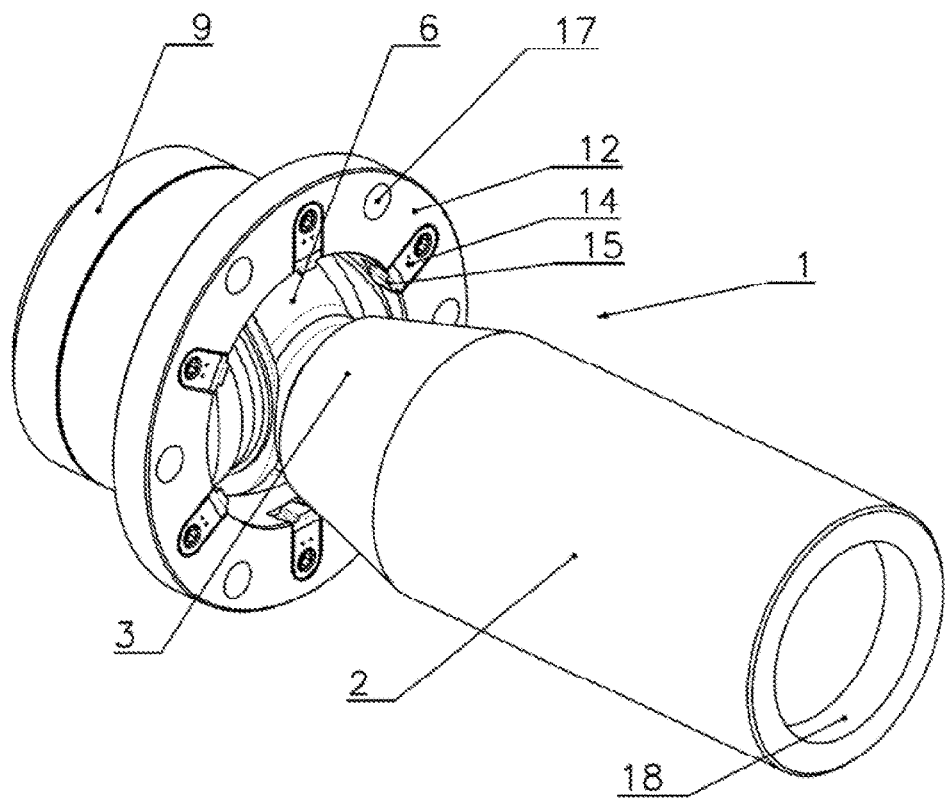
FIG. 4 shows the energy absorbing device in perspective view.

As shown in FIG. 4, the cutting tool 14 are in the form of knives for cutting, and the tips 15 of these knife blades are directed radially towards the centre of the body sleeve 12. Furthermore, at the end part of the sleeve-shaped rod 1 an inner ring 18 is formed increasing the rigidity of the structure and at the same time constituting an element that facilitates supporting and securing of the rod 1 in the structure of the railway coupling.

Figure 5:
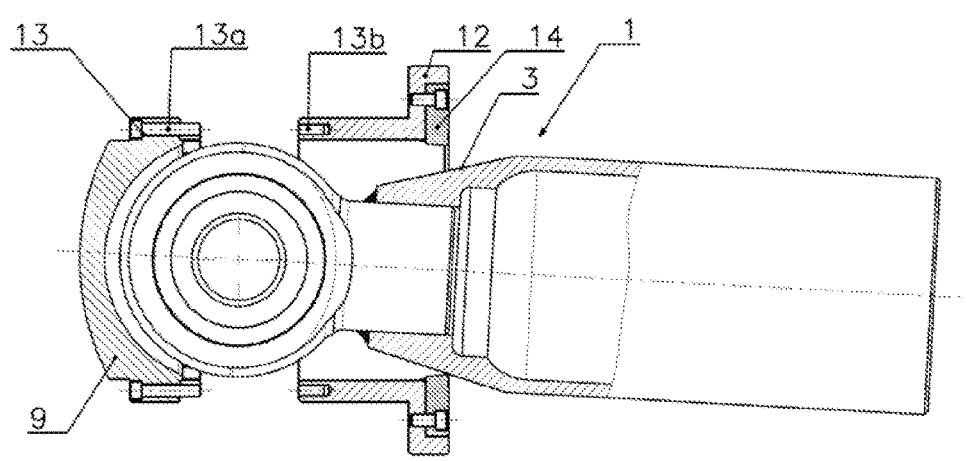
FIG. 5 shows the device according to the invention in a top view, such as in FIG. 1, at the first step of guidance.

FIG. 5 shows the first step of the angular guiding of the rod 1 relative to the body sleeve 12 with the cutting tools 14. After overrunning the limit pressure forces of the interconnected railway cars, the rupture of the breakable elements 13, in the form of screws with a determined strength, occurs so that a screw head 13a with a portion of its shank remains in the displaced support 9, and a remainder of a threaded shank 13b remains in the body sleeve 12 attached to the front wall of the car, not shown in the drawing. In this step, the cutting tools 14 press against one side of the angular guiding part 3, causing a generation of initial force guiding the rod 1 to an axial position relative to the body sleeve 12.

Figure 6:
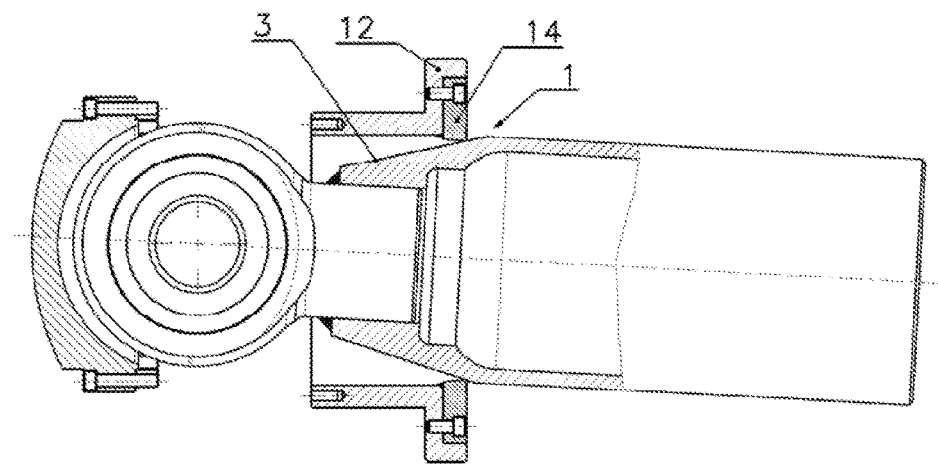
FIG. 6 shows the device according to the invention at the final step of guidance.

FIG. 6 illustrates the final step of the angular guidance of the rod 1 relative to the body sleeve 12 with the cutting tools 14. In this step, all the cutting tools 14 are in contact with the angular guiding part 3, however machining of that angular part takes place on one side, which results in an increased force, causing the straightening moment, guiding the rod 1 to the axial position relative to the body sleeve 12.

Figure 7:
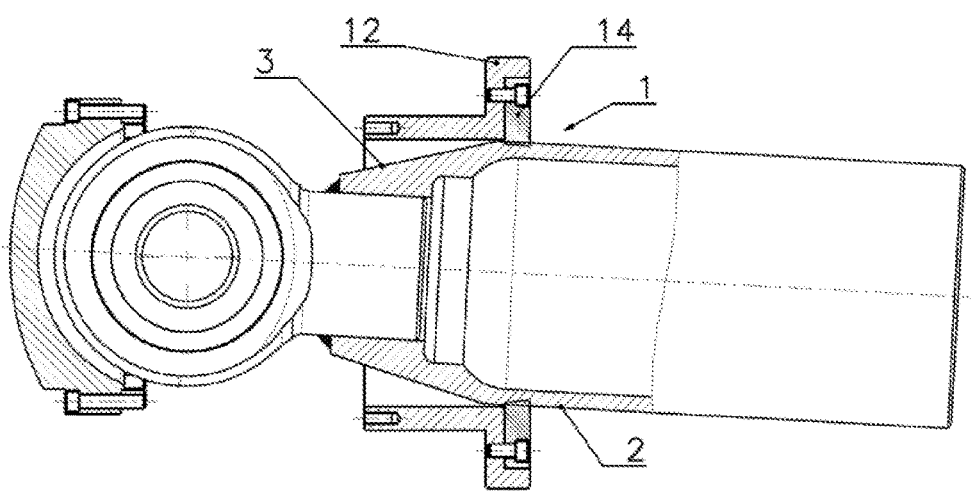
FIG. 7 shows the device according to the invention at the step of operation.

FIG. 7 shows the device according to the invention at the step of operation. In this step, some possible small angular deviations of the rod 1 relative to the body sleeve 12 are countered. In this step, all the cutting tools 14 are involved in the cutting process and substantial absorption of the kinetic energy of the impact of railway cars. In the case of non-axial movement of the rod 1 relative to the body sleeve 12, the increased cutting forces, caused by a greater penetration of the cutting tools 14 into the surface layer of the part 2 of the rod 1, suitable for cutting, produce the pressure of those more sunk cutting tools 14 onto the rod 1, and thus generate a further straightening moment affecting the precise alignment of the components advancing each other.

PARTS LIST FOR FIGS. 1-7

1—rod,
2—part of the rod which is suitable for cutting,

3—angular guiding part,
4—slot,
5—cylindrical part of the lug,
6—lug,
7—lug hole,
8—opening of the support,
9—support,
10—axle,
11—rod axis,
12—body sleeve,
13—breakable elements,
14—cutting tool,
15—tips of the blades of cutting tools,
16—mounting screw of the cutting tool,
17—holes for fixing the body sleeve to the front wall of the railway car,
18—inner ring,
α—angle of inclination of the angular guiding part relative to the axis of the rod.

These and other features will be readily apparent from the following claims.

The invention claimed is:

1. A device effective to absorb energy of impacts of railway cars, the device comprising:
   a rod with a part suitable for being cut,
   cutting tools mounted in a body sleeve and oriented to the inside thereof,
   the rod having an angular guiding part with a surface inclined relative to an axis of the rod,
   wherein the angular guiding part of the rod is connected with a lug pivotally attached to a support, and
   the body sleeve is connected to the support with breakable elements, in which the angular guiding part is sized and shaped so that when the rod moves toward the support, the angular guiding part is effective to guide the cutting tools toward the part of the rod suitable for being cut for alignment therewith.

2. The device according to claim 1, wherein the lug is embedded in openings of the support by an axle situated perpendicularly to the axis of the rod.

3. The device according to claim 1, wherein the breakable elements are screws with a determined strength.

4. The device according to claim 1, in which a surface of the angular guiding part is inclined at an angle (α) within the range from 7° to 30° relative to the axis of the rod.

5. The device according to claim 1, in which the surface of the angular guiding part is inclined at the angle (α) within the range from 11° to 23° relative to the axis of the rod.

6. The device according to claim 1, in which the surface of the angular guiding part is inclined at the angle (α) within the range from 12° to 18° relative to the axis of the rod.

7. The device according to claim 1, in which the angular guiding part has a conical shape.

8. The device according to claim 1, in which the rod has a sleeve form.

9. The device according to claim 8, wherein the rod has an increasing wall thickness in the angular guiding part.

10. The device according to claim 2, in which the lug has a cylindrical part configured to be embedded in a slot formed in the angular guiding part of the rod.

11. The device according to claim 1, in which the hardness of the surface layer of an initial region of the angular guiding part is greater than the difference in the hardness of the cutting tools and the hardness of the part suitable for being cut.

12. A device for absorbing energy of impacts of railway cars, the device comprising:
   a rod with a part suitable for being cut,
   cutting tools mounted in a body sleeve and oriented to the inside thereof,
   the rod having an angular guiding part with a surface inclined relative to an axis of the rod,
   wherein the angular guiding part of the rod is connected with a lug pivotally attached to a support, and
   the body sleeve being connected to the support with breakable elements and in which a surface of the angular guiding part is inclined at an angle (α) within the range from 7° to 30° relative to the axis of the rod.

13. The device according to claim 12, wherein the angular guiding part of the rod has a conical shape.

14. The device according to claim 12, in which the hardness of a surface layer of an initial region of the angular guiding part is greater than the difference in the hardness of the cutting tools and the hardness of the part suitable for being cut.

15. The device according to claim 12, in which the surface of the angular guiding part is inclined at the angle (α) within the range from 11° to 23° relative to the axis of the rod.

16. A device for absorbing energy of impacts of railway cars, comprising:
   a rod with a part suitable for being cut,
   cutting tools mounted in a body sleeve and oriented to the inside thereof,
   the rod having an angular guiding part with a surface inclined relative to an axis of the rod,
   wherein the angular guiding part of the rod is connected with a lug pivotally attached to a support, and
   the body sleeve is connected to the support with breakable elements in which the hardness of a surface layer of an initial region of the angular guiding part furthest from the part suitable for being cut is greater than the difference in the hardness of the cutting tools and the hardness of the part suitable for being cut.

17. The device according to claim 16, in which the angular guiding part has a conical shape.

18. The device according to claim 16, wherein the lug is embedded in openings of the support by an axle situated perpendicularly to the axis of the rod.

19. The device according to claim 16, in which the rod has a sleeve shape.

20. The device according to claim 16, in which a surface of the angular guiding part is inclined at an angle (α) within the range from 7° to 30° relative to the axis of the rod.

* * * * *